United States Patent
Ng

(10) Patent No.: US 9,950,798 B2
(45) Date of Patent: Apr. 24, 2018

(54) AIR CONDITIONING SYSTEM AND METHODS OF ASSEMBLING THE SAME

(71) Applicant: The Boeing Company, Seal Beach, CA (US)

(72) Inventor: Casey Y. K. Ng, Sammamish, WA (US)

(73) Assignee: THE BOEING COMPANY, Chicago, IL (US)

(*) Notice: Subject to any disclaimer, the term of this patent is extended or adjusted under 35 U.S.C. 154(b) by 884 days.

(21) Appl. No.: 14/194,917

(22) Filed: Mar. 3, 2014

(65) Prior Publication Data
US 2015/0246729 A1 Sep. 3, 2015

(51) Int. Cl.
*B64D 13/02* (2006.01)
*B64D 13/06* (2006.01)

(52) U.S. Cl.
CPC ........ *B64D 13/06* (2013.01); *B64D 2013/064* (2013.01); *B64D 2013/0688* (2013.01); *Y10T 29/49622* (2015.01)

(58) Field of Classification Search
CPC ................................................. B64D 2013/064
USPC .............................................. 454/71–74, 76
See application file for complete search history.

(56) References Cited

U.S. PATENT DOCUMENTS

| | | | |
|---|---|---|---|
| 6,401,473 B1* | 6/2002 | Ng | B64D 13/06 454/71 |
| 6,449,963 B1 | 9/2002 | Ng et al. | |
| 7,121,100 B2 | 10/2006 | Atkey et al. | |
| 7,849,931 B2 | 12/2010 | Ng | |
| 7,871,038 B2 | 1/2011 | Space et al. | |
| 8,087,255 B2* | 1/2012 | Klimpel | B64D 13/06 62/244 |
| 8,118,257 B2 | 2/2012 | Wilmot, Jr. et al. | |
| 9,090,350 B2* | 7/2015 | Kelnhofer | B64D 13/00 |
| 2004/0231350 A1* | 11/2004 | Kline | B64D 13/00 62/244 |

OTHER PUBLICATIONS

John Smith, CEO, Lake Mechanical | Nov. 4, 2010. "Round or Rectangular Duct: Some Advice." Contracting Business, Nov. 19, 2012, www.contractingbusiness.com/archive/round-or-rectangular-duct-some-advice. Accessed Aug. 16, 2017.*

* cited by examiner

*Primary Examiner* — Vivek Shirsat
(74) *Attorney, Agent, or Firm* — Armstrong Teasdale LLP

(57) ABSTRACT

An air conditioning system includes a first mix manifold and a second mix manifold. A first air conditioning pack is coupled in flow communication with the first mix manifold, wherein the first air conditioning pack is configured to channel a supply of fresh air to the first mix manifold. A second air conditioning pack is coupled in flow communication with the second mix manifold, wherein the second air conditioning pack is configured to channel the supply of fresh air to the second mix manifold. The first air conditioning pack is also coupled in flow communication with the second air conditioning pack.

20 Claims, 7 Drawing Sheets

AIR CONDITIONING SYSTEM AND METHODS OF ASSEMBLING THE SAME

BACKGROUND

The present invention relates to air conditioning systems and more particularly, to an air conditioning system that includes a dual mix manifold system architecture for distributing air to multiple portions of a vehicle.

At least some known vehicles, such as aircraft, supply a relatively constant flow of fresh air into the pressurized body of commercial aircraft for ventilating the passenger cabin, the cockpit, and other pressurized regions within the aircraft. In order to economically maintain the cabin at a relatively constant and comfortable temperature, a suitable pressure, and at a constant humidity level during operation, recirculation air from the cabin area of the aircraft is typically mixed with fresh air, also known as pack air or conditioned air, in a mix manifold located in a mix bay of the aircraft.

Traditionally, known aircraft each include a mix bay that houses a mix manifold having a relatively large diameter that generally determines the space requirement of the mix bay. Derivative models of the aircraft may be longer in length and may therefore include larger passenger cabin areas or larger cargo compartments that require a greater volume of pressurized air to maintain comfort levels of the passengers and crew. As such, the size of the mix manifold in such aircraft must be increased to accommodate the additional air volume. However, increasing the size of the mix manifold also requires a corresponding increase in the size of the mix bay. However, increasing the mix bay may significantly decrease the available volume of the cargo area. Decreasing the cargo area volume allows less passengers and goods to be transported and thus decreases the revenue generated. It would be desirable, therefore, to provide a derivative aircraft air conditioning system that channels a larger volume of air than known base model aircraft systems and that is usable with the size constraints of the existing base model aircraft mix bay.

BRIEF DESCRIPTION

In one aspect, an air conditioning system for use in an aircraft is provided. The air conditioning system includes a first mix manifold and a second mix manifold. A first air conditioning pack is coupled in flow communication with the first mix manifold, wherein the first air conditioning pack is configured to channel a supply of fresh air to the first mix manifold. A second air conditioning pack is coupled in flow communication with the second mix manifold, wherein the second air conditioning pack is configured to channel the supply of fresh air to the second mix manifold. The first air conditioning pack is also coupled in flow communication with the second air conditioning pack.

In another aspect, an aircraft is provided. The aircraft includes a first pressurized area and a second pressurized area. The aircraft also includes an air conditioning system configured to provide a volume of air to both the first and the second pressurized areas The air conditioning system includes a first mix manifold and a second mix manifold. A first air conditioning pack is configured to channel a supply of fresh air to the first mix manifold, and a second air conditioning pack is configured to channel the supply of fresh air to the second mix manifold. The first air conditioning pack is coupled in flow communication with the second air conditioning pack.

In yet another aspect, a method of assembling an air conditioning system for use in an aircraft is provided. The method includes positioning a first mix manifold and a second mix manifold in a mix bay. A first air conditioning pack is coupled in flow communication with the first mix manifold and is configured to channel a supply of fresh air to the first mix manifold. A second air conditioning pack is coupled in flow communication with the second mix manifold and is configured to channel the supply of fresh air to the second mix manifold. The method also includes coupling the first air conditioning pack in flow communication with the second air conditioning pack.

DETAILED DESCRIPTION

An air conditioning system and method of assembly for an aircraft is provided. The air conditioning system as described herein is highly efficient, lightweight, and is designed to mix recirculated cabin air with fresh air to provide a greater volume of air to the pressurized areas of the derivative aircraft cabin than is processed to the same aircraft using known air conditioning systems. As such, the present disclosure is particularly advantageous for derivative models of base models of large, commercial type aircraft. It should be noted, however, that the air conditioning system described herein is not limited to derivative models of aircraft and may also be implemented with original, base model aircraft. Regardless of the model of aircraft, the air conditioning system and method described herein is designed to increase a volume of air distributed to pressurized portions of the aircraft without requiring the size of the aircraft's mix bay to be increased to accommodate additional passengers, cargo, and/or equipment capacities available in the base aircraft.

Figure 1:
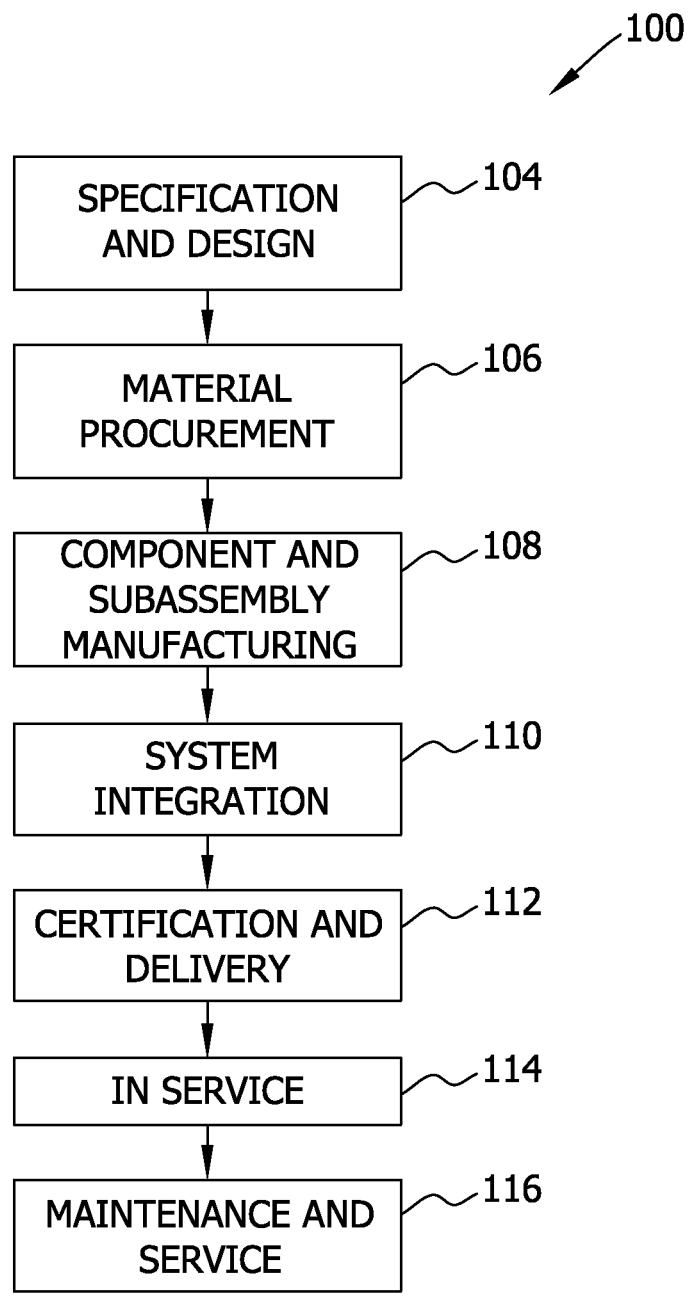
FIG. 1 is a flow diagram of an exemplary aircraft production and service methodology.
Figure 2:
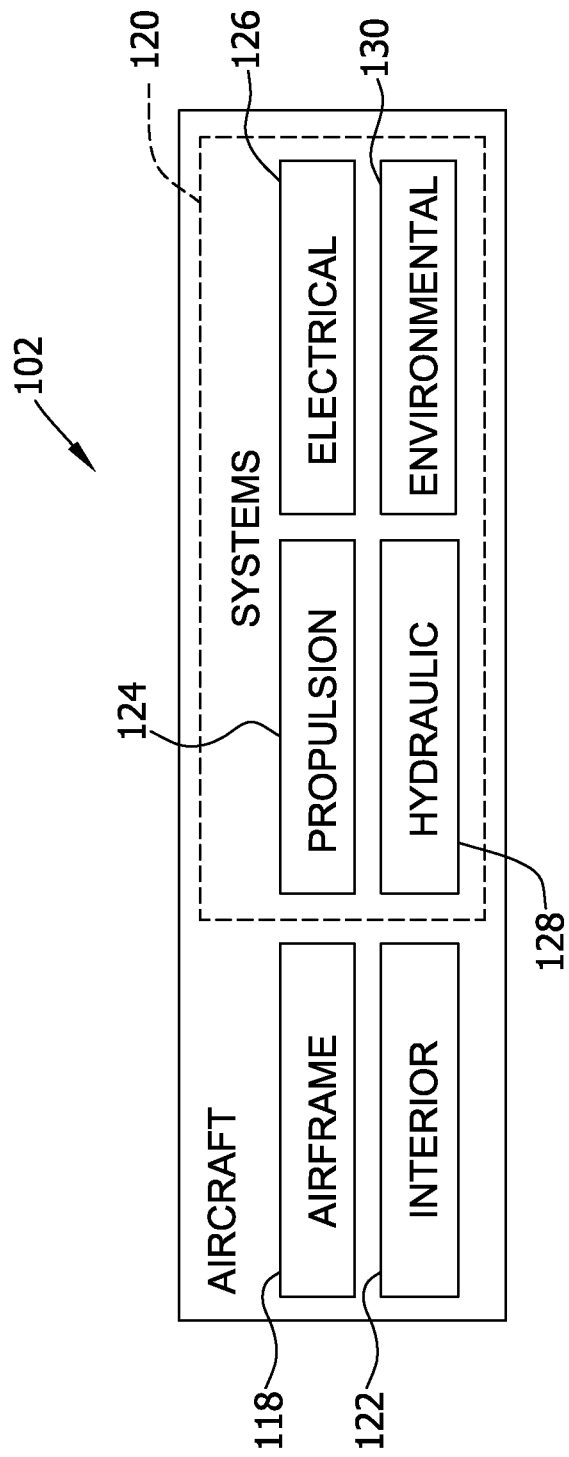
FIG. 2 is a block diagram of an exemplary aircraft.

Referring FIG. 1, implementations of the disclosure may be described in the context of an aircraft manufacturing and service method 100 and via an aircraft 102 (shown in FIG. 2). During pre-production, including specification and design 104 data of aircraft 102 may be used during the manufacturing process and other materials associated with the airframe may be procured 106. During production, component and subassembly manufacturing 108 and system integration 110 of aircraft 102 occurs, prior to aircraft 102 entering its certification and delivery process 112. Upon successful satisfaction and completion of airframe certification, aircraft 102 may be placed in service 114. While in service by a customer, aircraft 102 is scheduled for periodic, routine, and scheduled maintenance and service 116, including any modification, reconfiguration, and/or refurbishment, for example. In alternative implementations, manufacturing and service method 100 may be implemented via vehicles other than an aircraft.

Each portion and process associated with aircraft manufacturing and/or service 100 may be performed or completed by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 2, aircraft 102 produced via method 100 may include an airframe 118 having a plurality of systems 120 and an interior 122. Examples of high-level systems 120 include one or more of a propulsion system 124, an electrical system 126, a hydraulic system 128, and/or an environmental system 130. Any number of other systems may be included.

Apparatus and methods embodied herein may be employed during any one or more of the stages of method 100. For example, components or subassemblies corresponding to component production process 108 may be fabricated or manufactured in a manner similar to components or subassemblies produced while aircraft 102 is in service. Also, one or more apparatus implementations, method implementations, or a combination thereof may be utilized during the production stages 108 and 110, for example, by substantially expediting assembly of, and/or reducing the cost of assembly of aircraft 102. Similarly, one or more of apparatus implementations, method implementations, or a combination thereof may be utilized while aircraft 102 is being serviced or maintained, for example, during scheduled maintenance and service 116.

As used herein, the term "aircraft" may include, but is not limited to, airplanes, unmanned aerial vehicles (UAVs), gliders, helicopters, and/or any other object that travels through airspace. Further, in an alternative implementation, the aircraft manufacturing and service method described herein may be used in any manufacturing and/or service operation.

Figure 3:
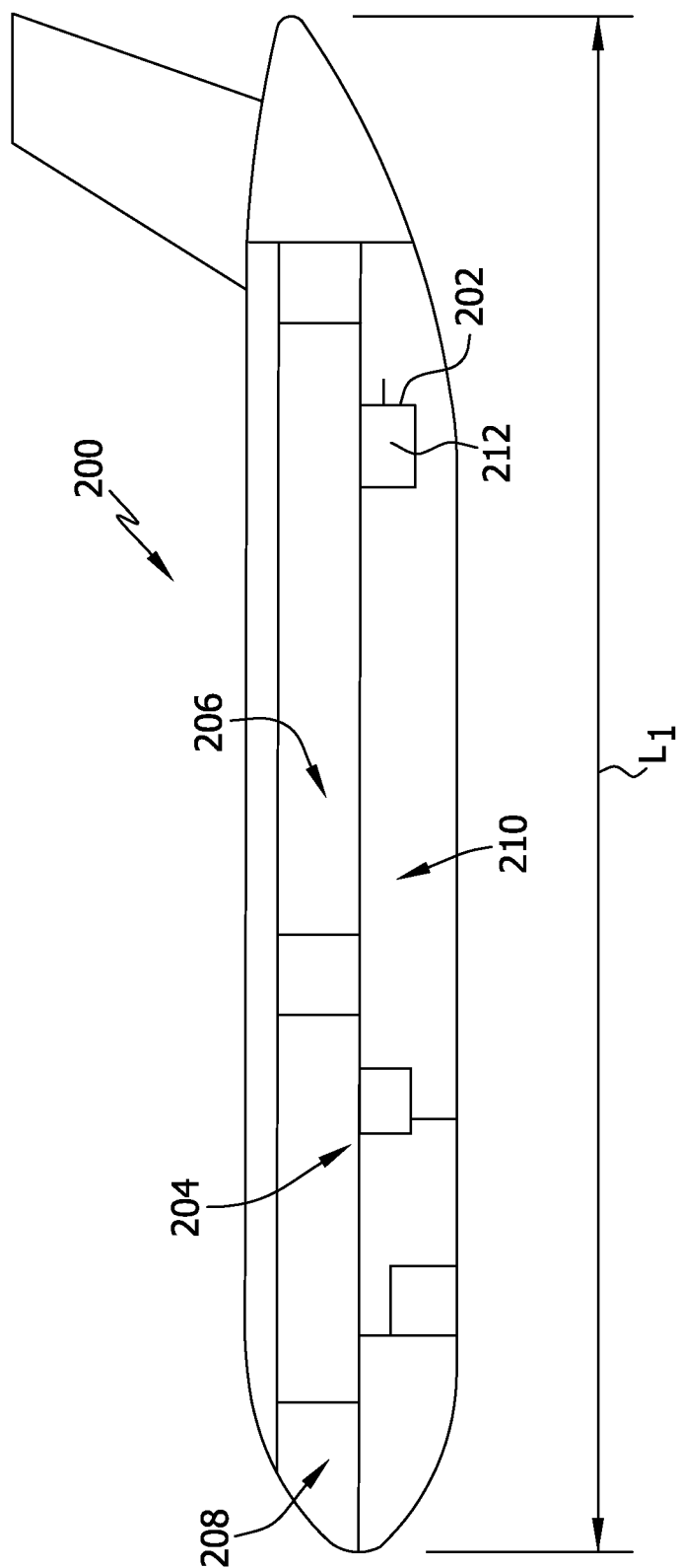
FIG. 3 is a simplified view of a known base model aircraft illustrating a cabin area, a cargo compartment, and a known air conditioning system.

Referring to FIG. 3, there is shown a mobile platform or aircraft 200 that includes a known air conditioning system 202. In the exemplary implementation, mobile platform 200 is a base model of a commercial passenger jet aircraft from which other derivative aircraft may be evolved. Aircraft 200 includes various pressurized areas that require a constant influx of air for passenger and crew comfort. In the exemplary implementation, such areas include a first passenger cabin 204, a second passenger cabin 206, a cockpit area 208, and a cargo stowage area 210 often referred to as the "lower lobe". In larger commercial jet passenger aircraft, cargo stowage area 210 may be segmented into a forward compartment and an aft compartment. Known system 202 is integrated in an aircraft 200 that includes either a single large stowage area, or alternatively, a segmented cargo stowage area, such that known system 202 is housed at least partially within the pressurized areas and a non-pressurized area. Aircraft 200 is a base model aircraft that has a first length $L_1$, and a mix bay 212, contained within a pressurized area, that is sized to house at least a portion of air conditioning system 202.

Figure 4:
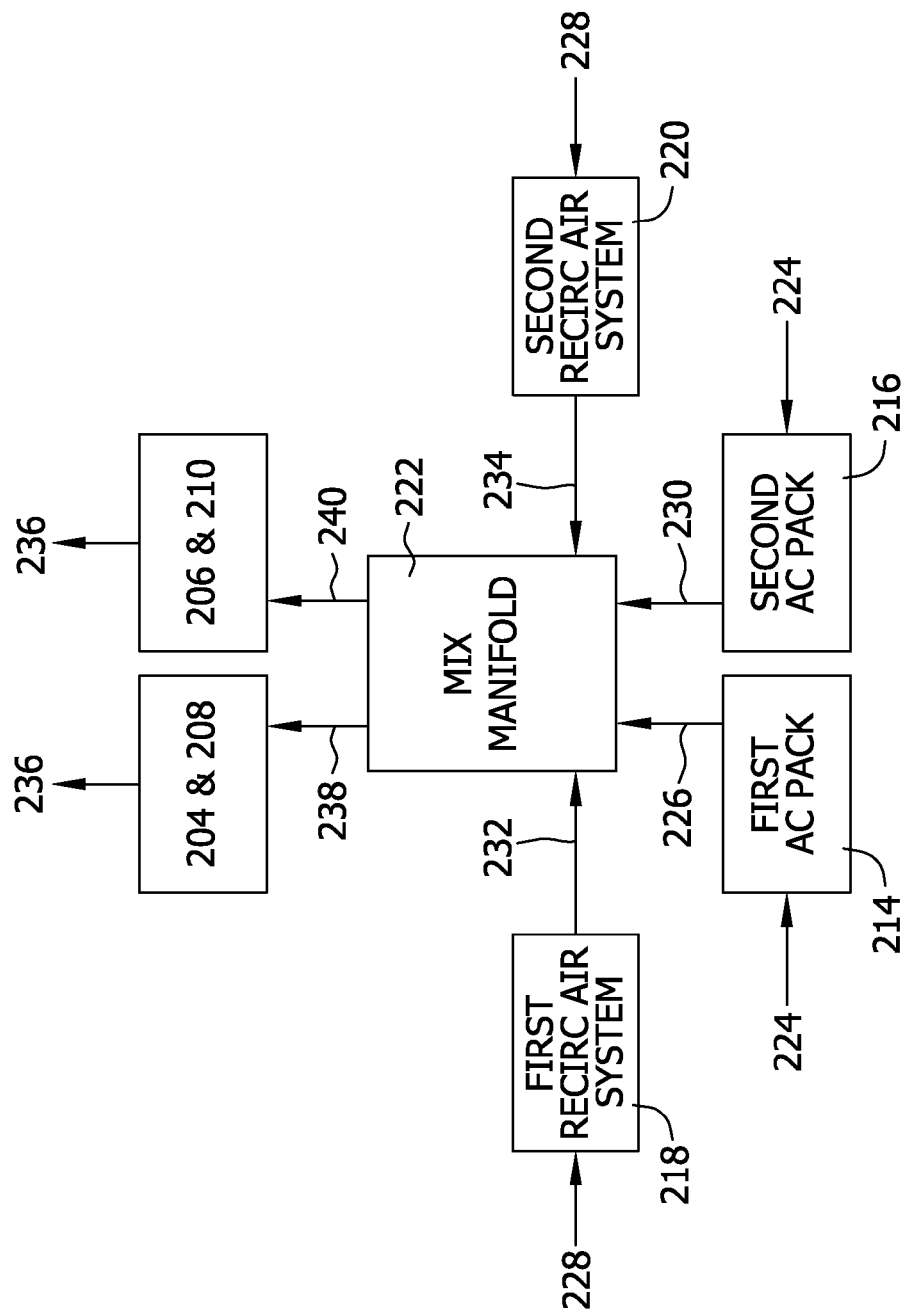
FIG. 4 is a schematic illustration of the air conditioning system that may be used in the aircraft shown in FIG. 3.

Air conditioning system 202 uses an open loop system that enables a mixture of fresh air and recirculated air to be processed into the pressurized compartments, such as passenger cabins 204 and 206, cockpit area 208, and cargo stowage area 210. Passenger cabins 204 and 206, cockpit area 208, and cargo stowage area 210 may also be referred to herein as "portions" of aircraft 200. An exemplary known air conditioning system 202 is illustrated in FIG. 4. In the exemplary implementation, air conditioning system 202 includes several components located in the pressurized portions 204, 206, 208, and 210 of aircraft 200. More specifically, at least a portion of system 202 is housed within mix bay 212. Air conditioning system 202 includes a first conditioning pack 214, a second conditioning pack 216, a first recirculation system 218, a second recirculation system 220, and a single mix manifold 222.

In operation, conditioning packs 214 and 216 properly condition a supply of fresh air 224. Fresh air 224, that is, air that has not yet been channeled at least once through pressurized portions 204, 206, 208, and 210, may be provided to pack 214 and 216 from various sources, such as a compressor of a gas turbine engine, or from an auxiliary power unit, such that relatively high temperature, high pressure air is supplied to packs 214 and 216 for treatment. First and second air conditioning packs 214 and 216 are traditionally a combination of heat exchangers, compressors, and turbines that are known in the art, although other types of air conditioning packs can be employed. First pack 214 provides fresh air 224 to mix manifold 222 via a first transfer duct 226 for mixing with a supply of recirculation air 228. Similarly, second air conditioning pack 216 provides fresh air 224 to mix manifold 222 via a second transfer duct 230 for mixing with recirculation air 228. To reduce the amount of fresh air 224 channeled from the source, recirculation air 228 is mixed with fresh air 224 in mix manifold 222.

Recirculation air 228 is drawn in from the pressurized areas of aircraft 200, such as passenger cabins 204 and 206, cockpit area 208, and/or cargo area 210, into first recirculation system 218 and second recirculation system 220. Recirculation systems 218 and 220 generally include a plurality of fans (not shown) that move recirculation air 228 through a third transfer duct 232 and through a fourth transfer duct 234, respectively, from passenger cabins 204 and 206, cockpit 208, and/or cargo area 210 to known air conditioning system 202. Filtered recirculation air 228 is then routed through transfer ducts 232 and 234 into mix manifold 222 for mixing with conditioned fresh air 224 from air conditioning packs 214 and 216.

In conventional high cooling capacity systems, such as air conditioning system 202, the mixing of sub-freezing fresh air 224 and recirculated cabin air 228 occurs in a single large mix manifold 222 located in mix bay 212 of base model aircraft 200. Mix manifold 222 also removes entrained moisture, such as ice particles or water droplets, from the air mixture and this prevents ice from propagating into passenger cabin 204 and/or 206. In particular, mix manifold 222 mixes fresh air 224 with recirculated air 228 to form a resultant air flow mixture 236 having a temperature that is sufficiently high such that entrained ice particles are substantially eliminated. More specifically, ice particles suspended in fresh air 224 are melted and condensed into droplets that are then collected in downstream ducting prior to distribution. Once mix manifold 222 has properly mixed flows of air 224 and 228, mix manifold 222 channels mixture 236 through a first distribution duct 238 and a second distribution duct 240 to various portions of base model aircraft 200. More specifically, first distribution duct 238 channels air mixture 236 to first cabin 204 and cockpit area 208, and second distribution duct 240 channels mixture 236 to second cabin 206 and cargo stowage area 210.

In air conditioning system 202, mix manifold 222 is a single piece of large diameter ducting having a diameter of approximately as much as 20 inches (in.) to 30 in. (0.508 meters (m) to 0.762 m) in some aircraft. Mix manifold 222 includes a circular cross-section that is sized to properly swirl fresh air 224 and recirculated air 228 to form mixture 236. A mix manifold having a different shaped cross-section may not mix flows 224 and 228 as efficiently. Furthermore, because mix bay 212 is located in the pressurized portion of base model aircraft 200, mix bay 212 is sized as small as possible to allow more space to accommodate passengers and cargo. As such, mix bay 212 is designed such that a maximum sized mix manifold 222 is housed therein. More specifically, mix bay 212 has a length that may be only slightly larger than the diameter of mix manifold 222 as such, the mix bay 212 on base model aircraft 200 is not able to accommodate a mix manifold that is larger than that for which it was originally designed.

Figure 5:
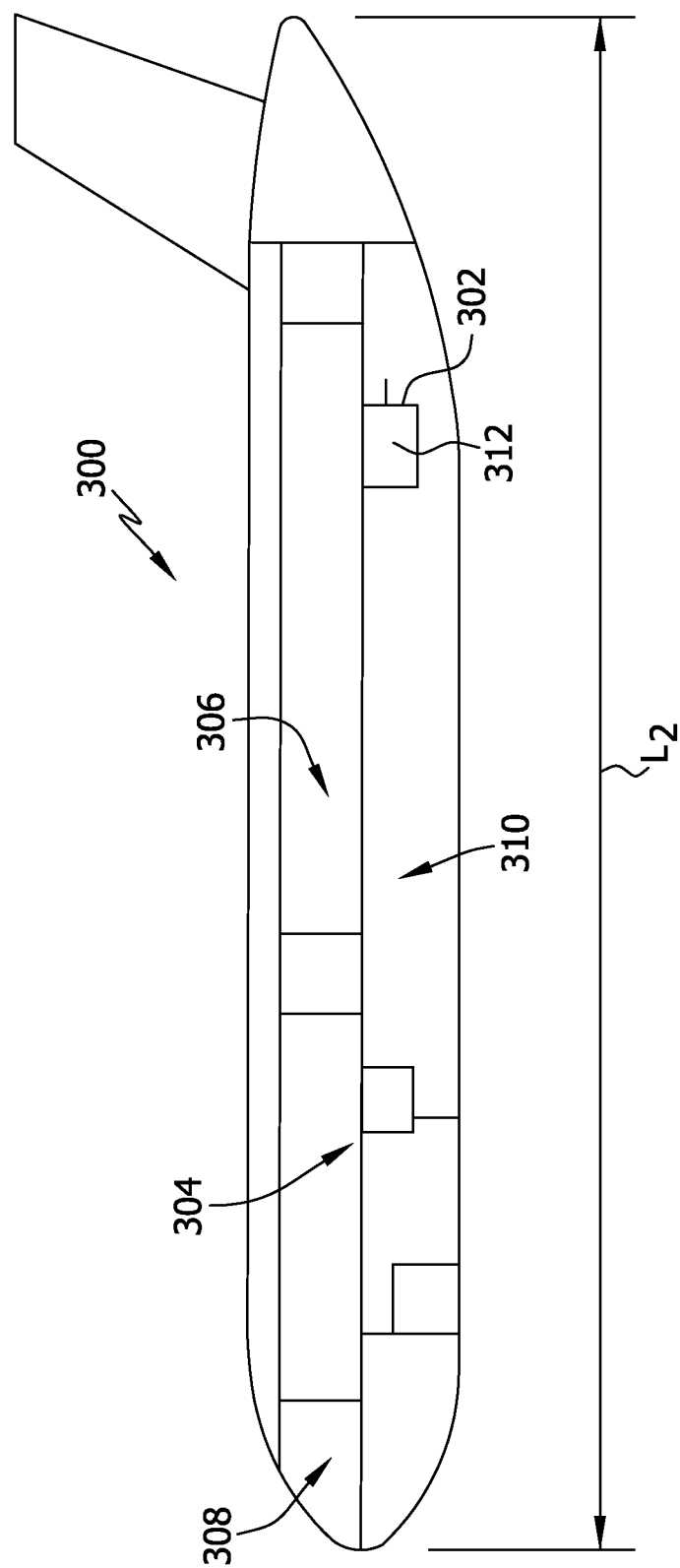
FIG. 5 is a simplified view of a derivative model aircraft of the base model shown in FIG. 3 and illustrating a cabin area, a cargo compartment, and an exemplary air conditioning system.

FIG. 5 illustrates an exemplary mobile platform 300 that includes an exemplary air conditioning system 302. In the exemplary implementation, mobile platform 300 is a commercial passenger jet aircraft. However, it should be appreciated that while the context of the discussion contained herein is with respect to a commercial jet passenger aircraft, it should be understood that the teachings of the present disclosure are compatible with all types of aircraft including, but not limited to, private propeller driven aircraft, private jets, commercial propeller driven passenger aircraft, cargo aircraft, military aircraft, and the like. Furthermore, although air conditioning system 302 disclosed herein is described as being compatible for use with an aircraft, it should be understood that air conditioning system 202 is compatible with other types of vehicles. For example, and without limitation, air conditioning system 302 may be implemented on board automobiles, buses, trains, ships, and/or spacecraft. Additionally, air conditioning system 302 is not limited to implementation on vehicles, but may also be compatible for use in houses, buildings, stadiums, theaters, and other permanent and/or semi-permanent structures.

In the exemplary implementation, aircraft 300 includes various pressurized areas that require a constant influx of air for passenger and crew comfort. Such areas include a first passenger cabin 304, a second passenger cabin 306, a cockpit area 308, and a cargo stowage area 310 (often referred to as the "lower lobe"). In larger commercial jet passenger aircraft, cargo stowage area 310 may be divided into a forward compartment and an aft compartment. Aircraft 300 may also include additional areas that require an inflow of air that are not specified herein. Air conditioning system 302, as will be appreciated from the following discussion, is integrated into an aircraft that makes use of either a single large stowage area, or alternatively a segmented cargo stowage area, such that system 302 is housed at least partially within the pressurized areas and a non-pressurized area.

In the exemplary implementation, aircraft 300 is a derivative model aircraft based on base model aircraft 200 (shown in FIG. 3). Alternatively, aircraft 300 may be an originally-designed aircraft. Aircraft 300 has a length $L_2$ that is longer than length $L_1$ of aircraft 200, such that aircraft 300 may carry a greater number of passengers and/or a greater amount of cargo as compared to aircraft 200. More specifically, pressurized areas of aircraft 300 such as, passenger cabins 304 and 306 and/or cargo stowage area 310, are extended in length to accommodate the increased passenger and cargo loads. As such, the additional passengers and/or cargo of aircraft 300 require an increased amount of conditioned air distributed to passenger cabins 304 and 304 and/or cargo stowage area 310.

Although aircraft 300 is longer than aircraft 200, each portion of aircraft 300 may not be elongated proportionately. For example, air conditioning system 302 of aircraft 300 includes a mix bay 312 that is substantially similar in size to mix bay 212 (shown in FIG. 3). The optimal purpose of longer aircraft 300 is to accommodate additional passengers and/or cargo to increase generated revenue. Because mix bay 312 is located in the pressurized portion of aircraft 300, similar to aircraft 200, lengthening mix bay 312 proportionately would cause mix bay 312 to occupy space that could otherwise be used for passenger cabins 304 and 306 and/or cargo stowage area 310. As such, a size of mix bay 312 in aircraft 300 is managed substantially similar to that used in base model aircraft 200.

As described above, at least passenger cabins 304 and 306 and/or cargo stowage area 310 should have an increased volume of airflow to support the additional passengers and/or cargo. Mix manifold 222 of air conditioning system 202 provides a maximum volume of air to aircraft 200, and, as such are not be used to provide the additional air for aircraft 300. One method increasing the volume of air would be to use a larger mix manifold in mix bay 312 than mix manifold 222. However, because of the design constraints described above, a larger mix manifold may be too large for use in mix bay 312 because mix bays 212 and 312 are approximately the same size. As such, mix bay 312 may be limited to using the same sized mix manifold as used in aircraft 200.

Figure 6:
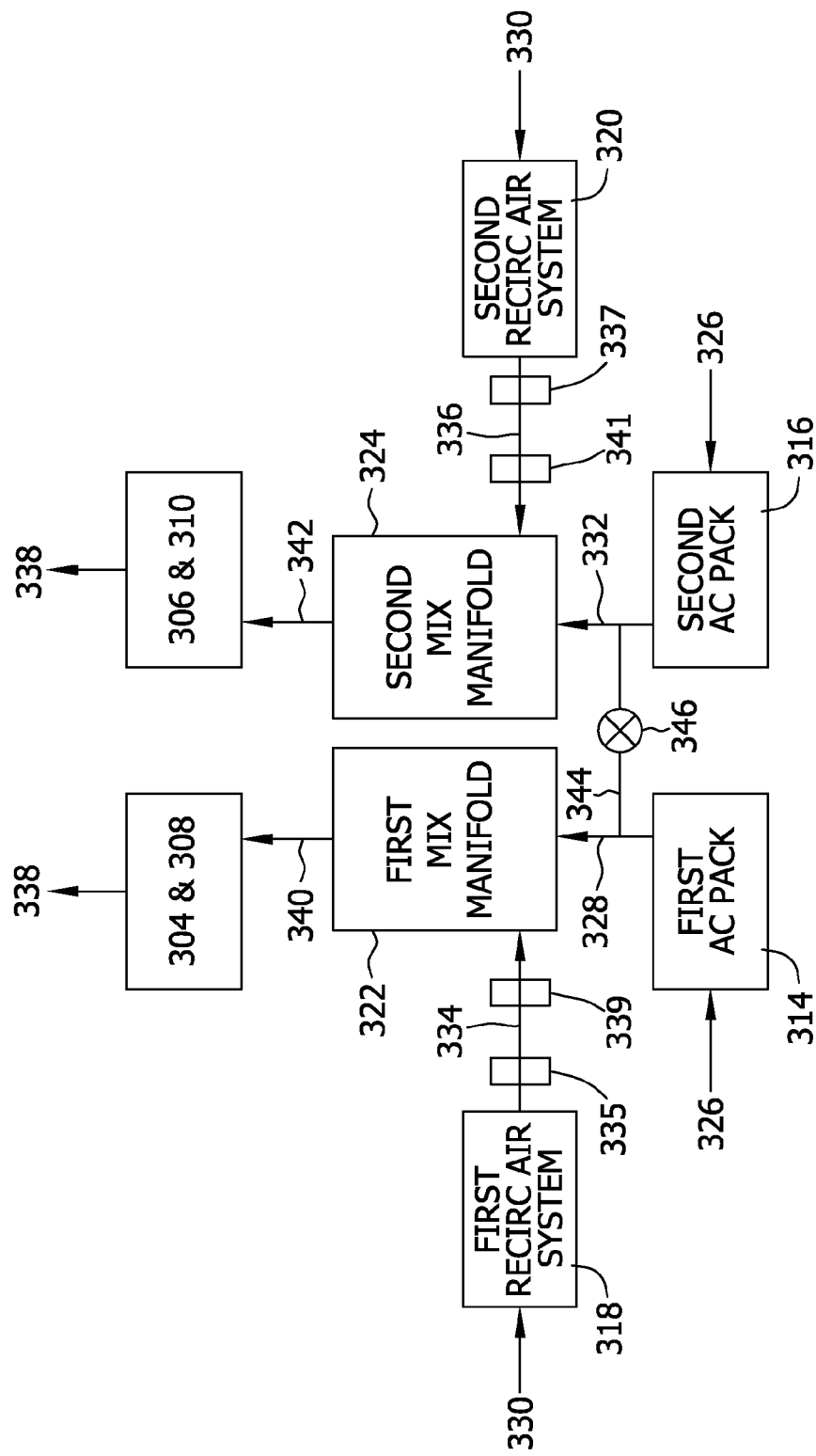
FIG. 6 is a schematic illustration of an exemplary implementation of the air conditioning system that may be used in the aircraft shown in FIG. 5.

In the exemplary implementation, aircraft 300 includes air conditioning system 302 to supply passenger cabins 304 and 306 and/or cargo stowage area 310 with the additional volume of air. Similar to known system 202, air conditioning system 302 uses an open loop system to provide a mixture of fresh air and recirculated air into the pressurized compartments of aircraft 300, such as cabin sections 304 and 306, cockpit area 308, and cargo stowage area 310. Cabin sections 304 and 306, cockpit area 308, and cargo area 310 may be referred to herein as "portions" of aircraft 300. As shown in FIG. 6, air conditioning system 302 includes several components located in the pressurized portions 304, 306, 308, and 310 of aircraft 300. More specifically, at least a portion of system 302 is located in mix bay 312. Air conditioning system 302 also includes a first conditioning pack 314, a second conditioning pack 316, a first recirculation system 318, a second recirculation system 320, a first mix manifold 322, and a second mix manifold 324. The relative locations of the various pieces of equipment included in system 302 may be altered without departing from the spirit or scope of the present disclosure.

In operation, air conditioning packs 314 and 316 condition a supply of fresh air 326. Fresh air 326 may be provided to packs 314 and 316 from various sources, such as a compressor of a gas turbine engine or an auxiliary power unit, such that relatively high temperature, high pressure air is supplied to packs 314 and 316 for treatment. First and second air conditioning packs 314 and 316 are traditionally a combination of heat exchangers, compressors, and turbines, although other types of air conditioning packs can be employed. First pack 314 provides fresh air 326 to first mix manifold 322 via a first transfer duct 328 for mixing with a supply of recirculation air 330. Similarly, second air conditioning pack 316 provides fresh air 326 to second mix manifold 324 via a second transfer duct 332 for mixing with recirculation air 330. Alternatively, packs 314 and 316 may be directly coupled to respective mix manifolds 322 and 324. In order to maintain pressure equilibrium, the volume of fresh air 326 provided by packs 314 and 316 is substantially equal to a volume of leakage air (not shown) that is vented to the environment outside aircraft 300. Thus, leakage air is constantly replenished in the pressurized portions 304, 306, 308, and 310 of aircraft 300. In order to facilitate running the necessary amount of fresh air 326 channeled from the source, recirculation air 330 is mixed with fresh air 326 in both mix manifolds 322 and 324.

Recirculation air 330 is drawn from the pressurized areas of aircraft 300, such as passenger cabins 304 and 306, cockpit area 308, and/or cargo area 310, into first recirculation system 318 and/or second recirculation system 320. Recirculation systems 318 and 320 generally include a plurality of fans (not shown) used to force recirculation air 330 through air conditioning system 302. More specifically, first recirculation system 318 channels recirculated air 330 from passenger cabins 304 and 306, cockpit area 308, and/or cargo area 310 through a third transfer duct 334 to first mix manifold 322 for mixing with fresh air 326 from first conditioning pack 314, to form an air mixture 338 for distribution throughout aircraft 300. Similarly, second recirculation system 320 channels recirculated air 330 from passenger cabins 304 and 306, cockpit area 308, and/or cargo area 310 through a fourth transfer duct 336 to second mix manifold 324 for mixing with fresh air 326 from second conditioning pack 316 to form mixture 338 for distribution throughout aircraft 300.

In the exemplary implementation, after first mix manifold 322 has properly mixed air flows 326 and 330, first mix manifold 322 channels mixture 338 through a first distribution duct 340 to first cabin 304 and cockpit area 308, and second mix manifold 324 channels mixture 338 through a second distribution duct 342 to second cabin 306 and cargo stowage area 310. Alternatively, first mix manifold 322 and second mix manifold 324 may channel air mixture 338 to any portion of aircraft 300 and are not limited to those areas specified herein. Also, in the exemplary implementation, recirculation systems 318 and 320 include a plurality of filters 335 and 337 within transfer ducts 334 and 336. Filters 335 and 337 remove particles, such as odor components and disease carriers, e.g. viruses, germs, bacteria, and other contaminants, from recirculation air 330. In one embodiment, system 302 also includes a first carbon dioxide stripper 339 positioned within first recirculation system 318 along third transport duct 334 and a second carbon dioxide stripper 341 within second recirculation system 320 along fourth transport duct 336.

As described above, in conventional high cooling capacity systems, such as known air conditioning system 202, the mixing of sub-freezing fresh air 224 and recirculated cabin air 228 occurs in a single large mix manifold 222 located in mix bay 212 of base model aircraft 200. However, larger derivative model aircraft 300 may require an increased volume of airflow than is provided by single manifold 222 of known air conditioning system 202. As such, air conditioning system 302 includes first and second manifolds 322 and 324 within mix bay 312 that are each smaller in diameter than manifold 222. In the exemplary implementation, first mix manifold 322 includes a diameter that is substantially similar to a diameter of second mix manifold 324. Alternatively, first mix manifold 322 may include a diameter that is different than a diameter of second mix manifold 324. More specifically, in the exemplary implementation, first and second mix manifolds 322 and 324 each include a circular cross-section having a diameter in a range of between approximately 15 in. to approximately 20 in (0.381 m to 0.508 m). Alternatively, mix manifolds 322 and 324 may have any size diameter that facilitates operation of air conditioning system 302 as described herein. Furthermore, first and second mix manifolds 322 and 324 are positioned in a side-by-side orientation across a width of mix bay 312, which is substantially similar to a width of aircraft 300 and longer than a length of mix bay 312.

In the exemplary implementation, manifolds 322 and 324, combined, provide an increased volume of air to pressurized portions 304, 306, 308, and 310 of aircraft 300 than single manifold 222 without modifying the size of mix bay 312 as compared to mix bay 212. For example, mix manifold 222 for base model aircraft 200 may be 25 in. in diameter. However, aircraft 300 may require up to a 20% increase in air flow volume provided to passenger cabins 206 and 208 and cargo area 210. A traditional solution is to use a single 28 in. diameter manifold to supply the additional air. However, the larger manifold requires a 3 in. increase in a length of mix bay 212, which would cause a 3 in. decrease in passenger cabin or cargo area length. With the dual mix manifold architecture of air conditioning system 302, two smaller mix manifolds 322 and 324, having a diameter of 20 in. each, are able to provide a similar 20% increase in flow capacity that fits within the same size mix bay.

Mix manifolds 322 and 324 are substantially similar in function to mix manifold 222 such that manifolds 322 and 324 are used to form air mixture 338 as described above and also to remove entrained moisture, such as ice particles or water droplets, from air mixture 338 and to prevent ice from propagating into passenger cabin 306 and 308. Such dual mix manifold architecture may be used, as described herein, in embodiments where a derivative model aircraft requires an increased volume of airflow, but a constant size mix bay may not allow for a larger mix manifold. Alternatively, the dual manifold architecture may be used in embodiments where a minimized mix bay is desired to facilitate larger passenger cabin and cargos areas for maximum passenger and cargo capacity.

In the exemplary implementation, air conditioning system also includes a crossover duct 344 that extends between first transport duct 328 and second transport duct 332 to facilitate single air conditioning pack operation. Crossover duct 344 includes a shutoff valve 346 configured to control a flow of conditioned fresh air 326 through crossover duct 344. Crossover duct 344 is configured to couple both of air conditioning packs 314 and 316 to both mix manifolds 322 and 324. In the exemplary implementation, crossover duct 344 acts as a failsafe such that should one of air conditioning packs 314 or 316 malfunction, then valve 346 is opened such that the remaining operational conditioning pack 314 or 316 provides fresh air 326 to both mix manifolds 322 and 324. In such a failsafe mode, air conditioning system 302 increases the operating capacity of the operating conditioning pack to maintain a flow capacity through aircraft 300 that at least meets industry regulations.

Figure 7:
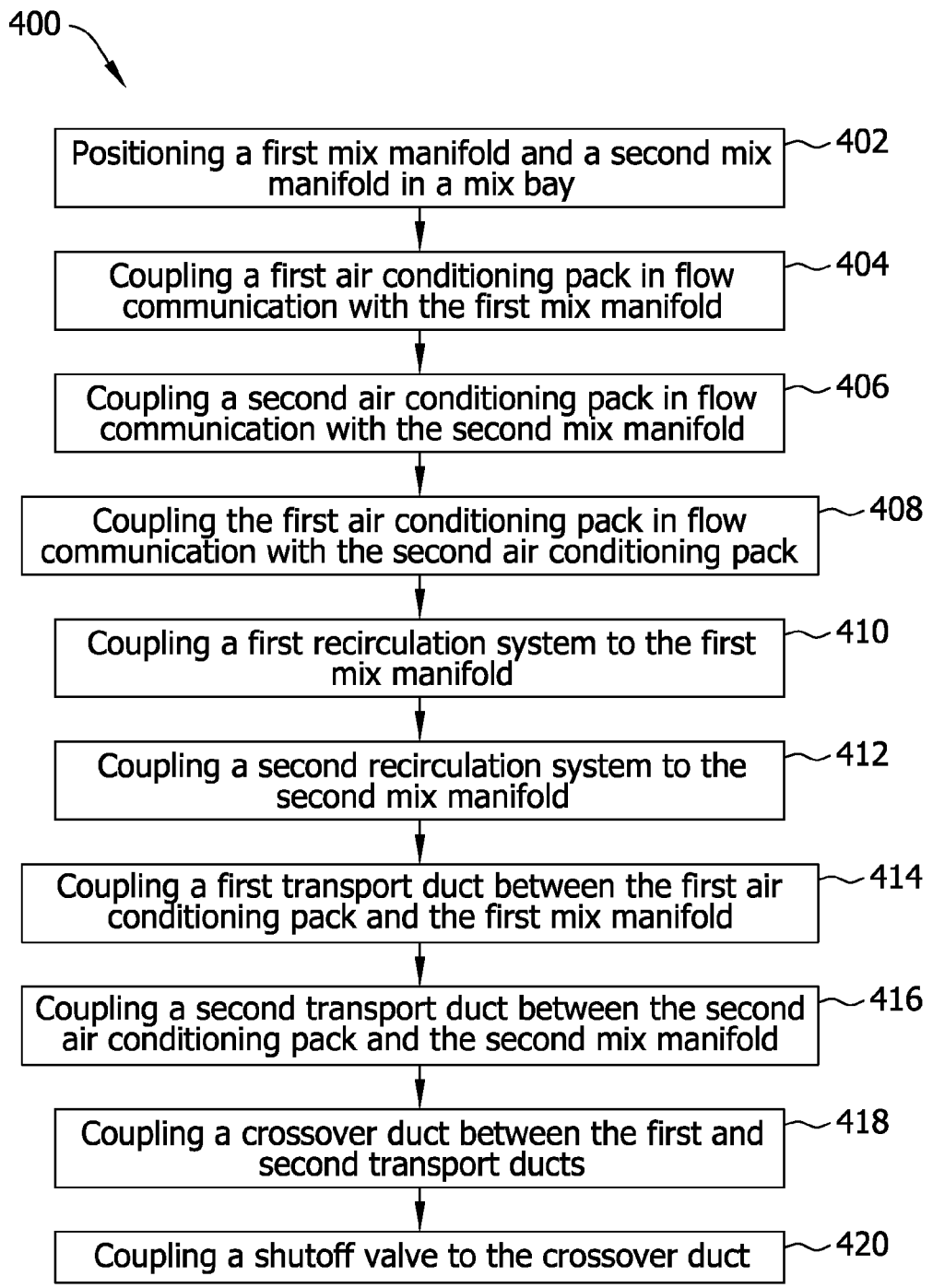
FIG. 7 is a schematic flow diagram of a method of assembling the air conditioning system shown in FIG. 6.

FIG. 7 is a schematic flow diagram of an exemplary method 400 of assembling an air conditioning system, such as air conditioning system 302 (shown in FIG. 6), on an aircraft, such as aircraft 300 (shown in FIG. 5) that includes a mix bay, such as mix bay 312 (shown in FIG. 6). The method includes positioning 402 a first mix manifold, such as first mix manifold 322 (shown in FIG. 6), and a second mix manifold, such as second mix manifold 324 (shown in FIG. 6), in the mix bay. The first and second mix manifolds are positioned within the mix bay in a side-by-side orientation across a width of the mix bay. The first and second mix manifolds are positioned within the mix bay such that the first mix manifold is configured to channel a mixture of fresh air and recirculated air to a first area, such as passenger cabin 304 and cockpit area 308 (shown in FIG. 5), and the second mix manifold is configured to channel the mixture to a second area, such as passenger cabin 306 and cargo area 310 (shown in FIG. 5). The method also includes coupling 404 a first air conditioning pack, such as first air conditioning pack 314 (shown in FIG. 6), in flow communication with the first mix manifold such that the first air conditioning pack is configured to channel a supply of fresh air to the first mix manifold. A second air conditioning pack, such as second air conditioning pack 316 (shown in FIG. 6), is coupled 406 in flow communication with the second mix manifold such that the second air conditioning pack is configured to channel the supply of fresh air to the second mix manifold. Furthermore, the first air conditioning pack is coupled 408 in flow communication with the second air conditioning pack.

In the exemplary implementation, method 400 also includes coupling 410 a first recirculation system, such as first recirculation system 318 (shown in FIG. 6), to the first mix manifold such that the first recirculation system is configured to channel a supply of recirculated air to the first mix manifold for mixing with the fresh air channeled from the first air conditioning pack. A second recirculation system, such as second recirculation system 320 (shown in FIG. 6), is coupled 412 to the second mix manifold such that the second recirculation system is configured to channel the supply of recirculated air to the second mix manifold for mixing with the fresh air channeled from the second air conditioning pack. Method 400 further includes coupling 414 a first transport duct, such as first transport duct 328 (shown in FIG. 6), between the first air conditioning pack and the first mix manifold and coupling 416 a second transport duct, such as second transport duct 332 (shown in FIG. 6), between the second air conditioning pack and the second mix manifold. Moreover, a crossover duct, such as crossover duct 344 (shown in FIG. 6), is coupled 418 between the first and second transport ducts such that the crossover duct is configured to selectively couple one of the first or the second air conditioning packs in flow communication with both of the first and second mix manifolds. Also, a shutoff valve, such as shutoff valve 346 (shown in FIG. 6), is coupled 420 to the transport duct and is configured to selectively control the supply of fresh air between the first and second transport ducts.

From the foregoing it will be seen that there has been shown and described an aircraft air conditioning system and method of assembly that provide several advantages. The dual mix manifold architecture air conditioning system and method described herein allows for the use of the same size mix bay in a larger derivative aircraft as the mix bay in the originally designed base model aircraft, while also providing the requisite high capacity airflow to pressurized regions of the derivative aircraft. As such, the exemplary air conditioning system eliminates the need to increase the size of the mix bay in the derivative aircraft to accommodate a larger single mix manifold. Accordingly, the size of the passenger and/or cargo area may be maximized to allow the derivative aircraft to carry maximum capacity, which increases the revenue generated by the aircraft. While particular embodiments of the invention have been shown and described, it will be understood that the invention is not limited thereto since modifications may be made by those skilled in the art, particularly in light of the foregoing teachings. It is therefore contemplated by the following claims to cover any such modifications and incorporate those features which constitute the essential features of these improvements within the spirit and scope of the invention.

This written description uses examples to disclose various implementations, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An aircraft comprising:
   a plurality of pressurized areas;
   a mix bay positioned in a first of said plurality of pressurized areas;
   a first mix manifold positioned in said mix bay;
   a first distribution duct configured to channel a first air mixture from said first mix manifold to a first subset of said plurality of pressurized areas;
   a second mix manifold positioned in said mix bay adjacent to said first mix manifold;
   a second distribution duct configured to channel a second air mixture from said second mix manifold to a second subset of said plurality of pressurized areas, wherein each of said first and second subsets includes at least one of said plurality of pressurized areas that is not included in the other of said first and second subsets;
   a first air conditioning pack configured to channel a supply of fresh air to said first mix manifold; and
   a second air conditioning pack configured to channel the supply of fresh air to said second mix manifold, wherein said first air conditioning pack is coupled in flow communication with said second air conditioning pack.

2. The aircraft in accordance with claim 1 further comprising a first recirculation system coupled in flow communication with said first mix manifold, wherein said first recirculation system is configured to channel a supply of recirculated air to said first mix manifold for mixing with the fresh air channeled from said first air conditioning pack.

3. The aircraft in accordance with claim 2 further comprising a second recirculation system coupled in flow communication with said second mix manifold, wherein said second recirculation system is configured to channel the supply of recirculated air to said second mix manifold for mixing with the fresh air channeled from said second air conditioning pack.

4. The aircraft in accordance with claim 1 further comprising:
   a first transport duct extending between said first air conditioning pack and said first mix manifold;
   a second transport duct extending between said second air conditioning pack and said second mix manifold; and
   a crossover duct extending between said first and said second transport ducts, said crossover duct configured to selectively couple one of said first or said second air conditioning packs in flow communication with both of said first and said second mix manifolds.

5. The aircraft in accordance with claim 4, wherein said crossover duct comprises a shutoff valve configured to selectively control the supply of fresh air between said first and said second transport ducts.

6. The aircraft in accordance with claim 1, wherein said first mix manifold includes a first diameter and said second mix manifold includes a second diameter that is substantially equal to the first diameter.

7. The aircraft in accordance with claim 1, wherein said first and said second mix manifolds are positioned in a side-by-side orientation within said mix bay.

8. The aircraft in accordance with claim 1, wherein said first mix manifold is configured to channel the first air mixture including a mixture of fresh air and recirculated air to a cockpit area of the plurality of pressurized areas, and said second mix manifold is configured to channel the second air mixture including a second mixture of fresh air and recirculated air to a cargo stowage area of the plurality of pressurized areas.

9. An aircraft comprising:
a plurality of pressurized areas including a first pressurized area and a second pressurized area;
a mix bay positioned in at least one of said plurality of pressurized areas;
a first mix manifold positioned in said mix bay and having a first circular cross-section;
a second mix manifold having a second circular cross-section and positioned in said mix bay adjacent to said first mix manifold in a side-by-side orientation such that a side of said first mix manifold is directly adjacent to a side of said second mix manifold, and such that an axis of said first circular cross-section of said first mix manifold is parallel to an axis of said second circular cross-section of said second mix manifold;
a first air conditioning pack configured to channel a supply of fresh air to said first mix manifold; and
a second air conditioning pack configured to channel the supply of fresh air to said second mix manifold, wherein each of said first and second air conditioning packs is configured to provide a volume of air to both said first and said second pressurized areas; a first distribution duct configured to channel a first air mixture from said first mix manifold to a first subset of said plurality of pressurized areas; and a second distribution duct configured to channel a second air mixture from said second mix manifold to a second subset of said plurality of pressurized areas, wherein each of said first and second subsets includes at least one of said plurality of pressurized areas that is not included in the other of said first and second subsets.

10. The aircraft in accordance with claim 9, further comprising:
a first transport duct extending between said first air conditioning pack and said first mix manifold;
a second transport duct extending between said second air conditioning pack and said second mix manifold; and
a crossover duct extending between said first and said second transport ducts, said crossover duct configured to selectively couple one of said first or said second air conditioning packs in flow communication with both of said first and said second mix manifolds.

11. The aircraft in accordance with claim 10, wherein said crossover duct comprises a shutoff valve configured to selectively control the supply of fresh air between said first and said second transport ducts.

12. The aircraft in accordance with claim 9, wherein the aircraft is a derivative model aircraft derived from a base model aircraft.

13. The aircraft in accordance with claim 9, wherein said first mix manifold is configured to channel the first air mixture including a mixture of fresh air and recirculated air to said first pressurized area and said second mix manifold is configured to channel the second air mixture including a second mixture of fresh air and recirculated air to said second pressurized area.

14. A method of assembling an air conditioning system for use in an aircraft, said method comprising:
positioning a first mix manifold adjacent a second mix manifold in a mix bay, the mix bay positioned in a pressurized portion of the aircraft;
coupling a first distribution duct in flow communication between the first mix manifold and a first subset of a plurality of pressurized areas of the aircraft;
coupling a second distribution duct in flow communication between the second mix manifold and a second subset of a plurality of pressurized areas of the aircraft, wherein each of the first and second subsets includes at least one of the plurality of pressurized areas that is not included in the other of the first and second subsets;
coupling a first air conditioning pack in flow communication with the first mix manifold, wherein the first air conditioning pack is configured to channel a supply of fresh air to the first mix manifold;
coupling a second air conditioning pack in flow communication with the second mix manifold, wherein the second air conditioning pack is configured to channel the supply of fresh air to the second mix manifold; and
coupling the first air conditioning pack in flow communication with the second air conditioning pack.

15. The method in accordance with claim 14 further comprising:
coupling a first transport duct between the first air conditioning pack and the first mix manifold;
coupling a second transport duct between the second air conditioning pack and the second mix manifold; and
coupling a crossover duct between the first and second transport ducts, wherein the crossover duct is configured to selectively couple one of the first or second air conditioning packs in flow communication with both of the first and second mix manifolds.

16. The method in accordance with claim 15 further comprising coupling a shutoff valve to the crossover duct, wherein the shutoff valve is configured to selectively control the supply of fresh air between the first and second transport ducts.

17. The method in accordance with claim 14, wherein positioning the first mix manifold adjacent the second mix manifold further comprises positioning the first mix manifold and the second mix manifold in a side-by-side orientation in the mix bay.

18. The method in accordance with claim 14, wherein coupling the first distribution duct comprises coupling the first distribution duct in flow communication between the first mix manifold and a cockpit area of the plurality of pressurized areas, and coupling the second distribution duct comprises coupling the second distribution duct in flow communication between the second mix manifold and a cargo stowage area of the plurality of pressurized areas.

19. The method in accordance with claim 14 further comprising:
coupling a first recirculation system to the first mix manifold, wherein the first recirculation system is configured to channel a supply of recirculated air to the first mix manifold for mixing with the fresh air channeled from the first air conditioning pack; and
coupling a second recirculation system to the second mix manifold, wherein the second recirculation system is configured to channel the supply of recirculated air to the second mix manifold for mixing with the fresh air channeled from the second air conditioning pack.

20. The aircraft in accordance with claim 1, wherein said first air conditioning pack is coupled in flow communication with said first mix manifold, and wherein said second air conditioning pack is coupled in flow communication with said second mix manifold.

\* \* \* \* \*